United States Patent [19]

Zwick et al.

[11] Patent Number: 4,499,663
[45] Date of Patent: Feb. 19, 1985

[54] METHOD OF FABRICATING A MONOLITHIC CORE FOR A SOLID OXIDE FUEL CELL

[75] Inventors: Stanley A. Zwick, Woodridge; John P. Ackerman, Downers Grove, both of Ill.

[73] Assignee: The United States of America as represented by the United States Department of Energy, Washington, D.C.

[21] Appl. No.: 541,184

[22] Filed: Oct. 12, 1983

[51] Int. Cl.³ ............................................. H01M 8/10
[52] U.S. Cl. ...................................... 29/623.1; 429/32; 429/40
[58] Field of Search ............................ 29/623.1, 623.5; 429/32, 33, 41, 44, 193, 40; 204/421

[56] References Cited

U.S. PATENT DOCUMENTS

| | | | |
|---|---|---|---|
| 3,402,230 | 9/1968 | White, Jr. | 429/31 X |
| 3,558,360 | 1/1971 | Sverdrup et al. | 429/40 X |
| 3,617,385 | 11/1971 | Gray | 429/39 |
| 3,647,542 | 3/1972 | Berger | 429/40 X |
| 3,754,995 | 8/1973 | Kleinschmager | 429/37 |
| 3,834,943 | 9/1974 | Van den Berghe et al. | 429/33 |
| 3,905,775 | 9/1975 | Sowards et al. | 422/180 |
| 4,142,024 | 2/1979 | Van den Berghe et al. | 429/41 |
| 4,195,119 | 3/1980 | Kummer | 429/38 |
| 4,248,941 | 2/1981 | Louis et al. | 429/30 X |
| 4,317,867 | 3/1982 | Warszawski | 429/42 |

Primary Examiner—Anthony Skapars
Attorney, Agent, or Firm—Charles F. Lind; Hugh W. Glenn

[57] ABSTRACT

A method is disclosed for forming a core for use in a solid oxide fuel cell that electrochemically combines fuel and oxidant for generating galvanic output. The core has an array of electrolyte and interconnect walls that are substantially devoid of any composite inert materials for support consisting instead only of the active anode, cathode, electrolyte and interconnect materials. Each electrolyte wall consists of cathode and anode materials sandwiching electrolyte material therebetween, and each interconnect wall consists of the cathode and anode materials sandwiching interconnect material therebetween. The electrolyte and interconnect walls define a plurality of substantially parallel core passageways alternately having respectively the inside faces thereof with only the anode material or with only the cathode material exposed. In the wall structure, the electrolyte and interconnect materials are only 0.002-0.01 cm thick; and the cathode and anode materials are only 0.002-0.05 cm thick. The method consists of building up the electrolyte and interconnect walls by depositing each material on individually and endwise of the wall itself, where each material deposit is sequentially applied for one cycle; and where the depositing cycle is repeated many times until the material buildup is sufficient to formulate the core. The core is heat cured to become dimensionally and structurally stable.

19 Claims, 12 Drawing Figures

Fig. 4
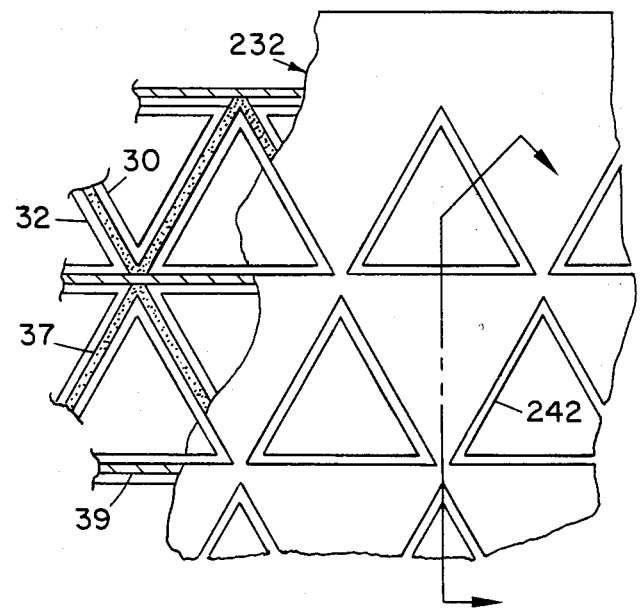
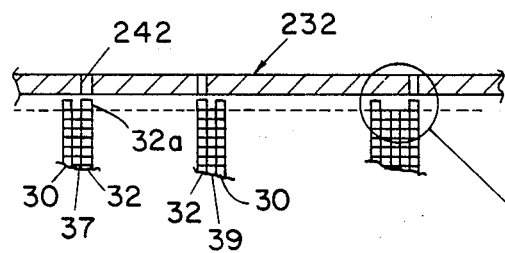
Fig. 4a
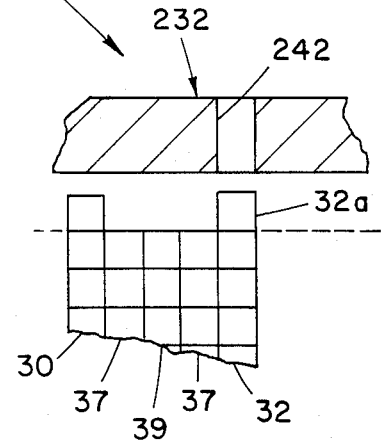

Fig. 5
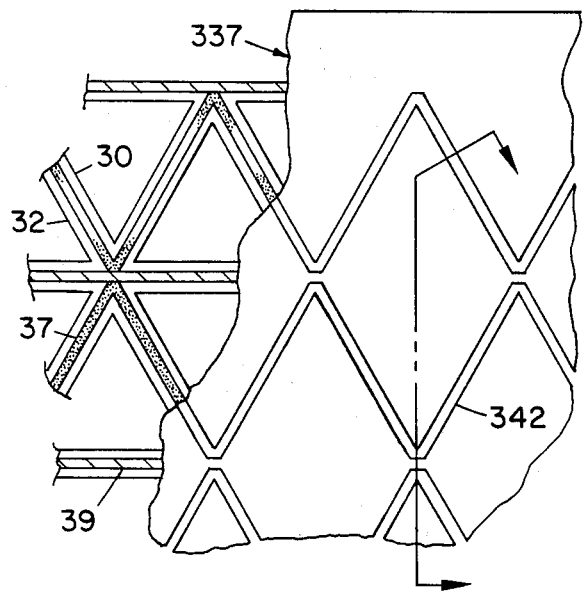
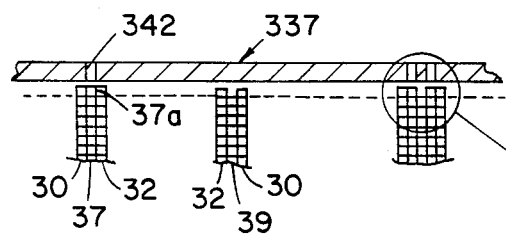
Fig. 5a
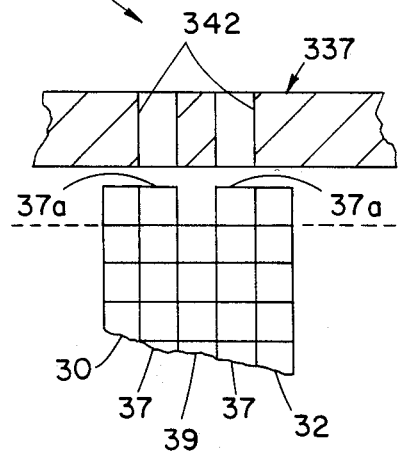

Fig. 6
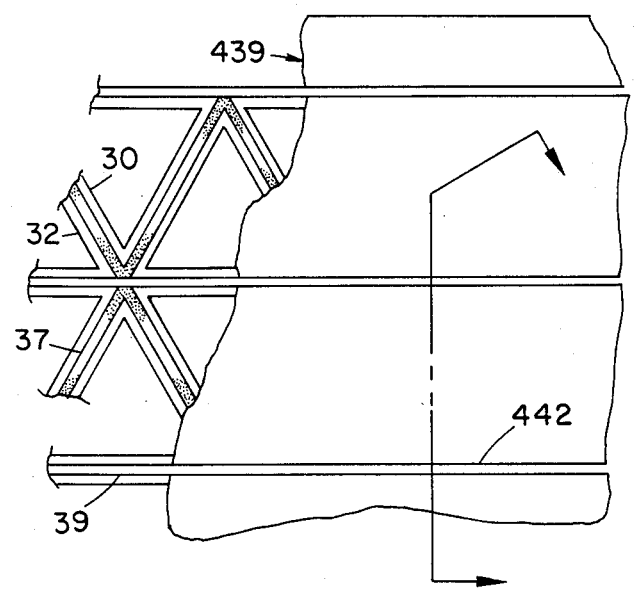
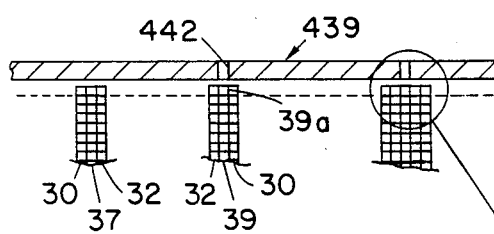
Fig. 6a
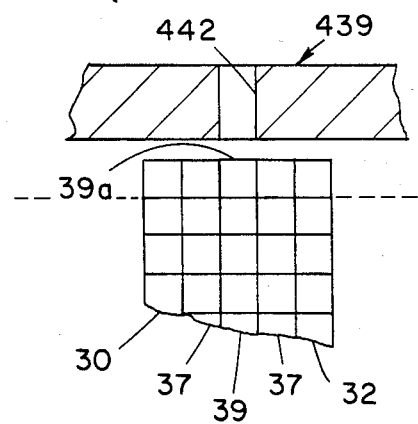

Fig. 7
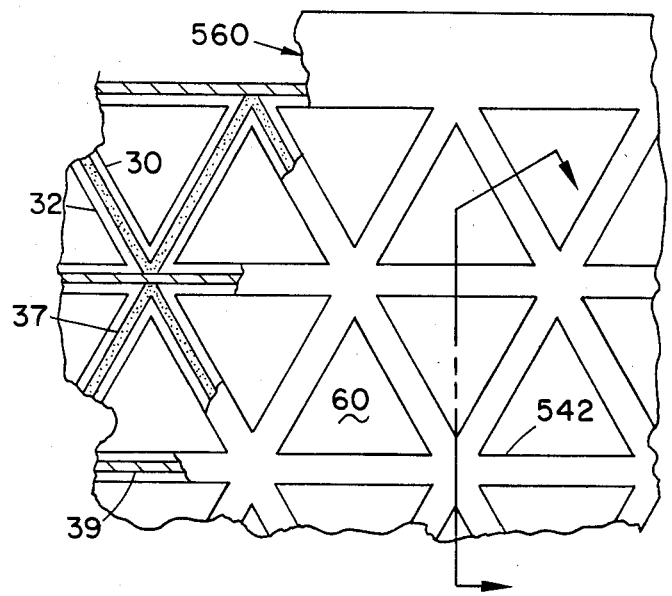
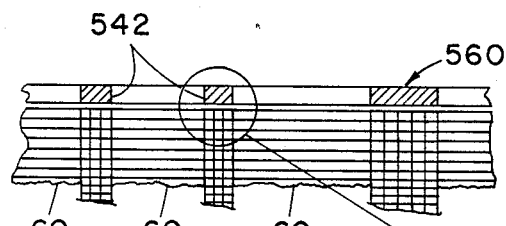
Fig. 7a
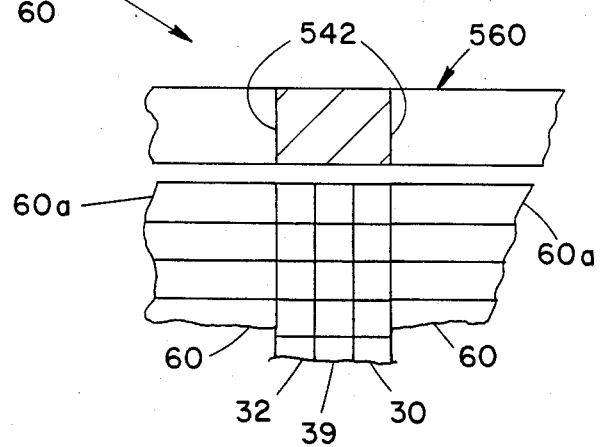

METHOD OF FABRICATING A MONOLITHIC CORE FOR A SOLID OXIDE FUEL CELL

CONTRACTUAL ORIGIN OF THE INVENTION

The U.S. Government has rights in this invention pursuant to Contract No. W-31-109-ENG-38 between the U.S. Department of Energy and the University of Chicago representing Argonne National Laboratory.

BACKGROUND OF THE INVENTION

A fuel cell is basically a galvanic energy conversion device that chemically combines hydrogen or a hydrocarbon fuel and an oxidant within catalytic confines to produce a DC electrical output. In one form of fuel cell, cathode material defines the passageways for the oxidant and anode material defines the passageways for the fuel, and an electrolyte separates the cathode and anode materials. The fuel and oxidant, typically as gases, are then continuously passed through the cell passageways separated from one another, and unused fuel and oxidant discharged from the fuel cell generally also remove the reaction products and heat generated in the cell. Being infeeds, the fuel and oxidant are typically not considered an integral part of the fuel cell itself.

The type of fuel cell for which this invention has direct applicability is known as the solid electrolyte or solid oxide fuel cell, where the electrolyte is in solid form in the fuel cell. In the solid oxide fuel cell, hydrogen or a high order hydrocarbon is used as the fuel and oxygen or air is used as the oxidant, and the operating temperatures of the fuel cell is between 700° and 1,100° C.

The hydrogen reaction on the anode (the negative electrode) with oxide ions generates water with the release of electrons; and the oxygen reaction on the cathode with the electrons effectively forms the oxide ions. Electrons flow from the anode through the appropriate external load to the cathode, and the circuit is closed internally by the transport of oxide ions through the electrolyte. The electrolyte insulates the cathode and anode from one another with respect to electron flow, but permits oxygen ions to flow from the cathode to the anode. Thus, the reactions are, at the:

cathode $\frac{1}{2}O_2 + 2e^- \rightarrow O^{-2}$ (1)

anode $H_2 + O^{-2} \rightarrow H_2O + 2e^-$. (2)

The overall cell reaction is $H_2 + \frac{1}{2}O_2 \rightarrow H_2O$. (3)

In addition to hydrogen, the fuel can be derived from a hydrocarbon such as methane ($CH_4$) reformed by exposure to steam at 350° C. or above, which initially produces carbon monoxide (CO) and three molecules of hydrogen. As hydrogen is consumed, a shift in reaction occurs to
$CO + H_2O \rightarrow CO_2 + H_2$. (4)

The overall reaction of hydrocarbons in the cell is illustrated by
$CH_4 + 2O_2 \rightarrow CO_2 + 2H_2O$. (5)

Inasmuch as the conversion is electrochemical, the thermal limitations of the Carnot cycle are circumvented; therefore efficiencies in the range exceeding 50% fuel heat energy conversion to electrical output can be theoretically obtained. This is much higher than equivalent thermal engines utilizing the same fuel conversion, including even a conventional diesel powered engine.

The electrolyte isolates the fuel and oxidant gases from one another while providing a medium allowing the ionic transfer and voltage buildup across the electrolyte. The electrodes (cathode and anode) provide paths for the internal movement of electrical current within the fuel cell to the cell terminals, which also connect then with an external load. The operating voltage across each cell is of the order of 0.7 volts maximum, so the individual cells must be placed in electrical series to obtain a useful load voltage. A series connection is accomplished between adjacent cells with an interconnect material which isolates the fuel and oxidant gases from one another while yet electronically connects the anode of one cell to the cathode of an adjoining cell. As the active electrochemical generation of electricity takes place only across the electrolyte portions of the fuel cell, any interconnect separation between the cathode and anode in order to provide the series electrical connection between the cells renders that part of the fuel cell electrically nonproductive. The percentage of interconnect to electrolyte wall area defining each cell, if high, could significantly reduce the energy or power densities of such a fuel cell.

Diffusion of the reacting species (fuel or oxidant) through the electrodes to the electrolyte also limits the cell performance. Fuel and oxidant must diffuse away from the flow in the respective passageways through the electrolyte to the reaction sites. The fuel and oxidant diffuse through the electrodes to the electrolyte and react at (or near) the three-phase boundary of the gases, the electrodes (anode or cathode), and electrolyte, where electrochemical conversion occurs. As the hydrogen partial pressure of the fuel gases decreases along the length of the fuel passageways, less voltage is generated near or at the downstream end of the fuel passageways.

While it is possible to thermally and electrically extract great quantities of energy from the fuel, it is also inherently inefficient to extract such energies to the complete depletion of the fuel and oxidant. Complete conversion of the fuel in the fuel cell is thus not sought as it is intrinsically inefficient in the overall output of the cell voltage. For both a single cell and cells in gas flow series, the maximum theoretical voltage decreases along the cell. Practical fuel cells therefore consume only 80 to 90% of the fuel because the cell voltage decreases rapidly as the hydrogen becomes less than 5% of the fuel gas. The reduction in maximum cell voltage as the fuel is consumed is an important limitation.

One proposed series of solid oxide fuel cells utilizes a ceramic support tube, and the electrodes (anode and cathode) and electrolyte are built up as layers on the support tube. The support tube is confined in a sealed housing, and the fuel and oxidant are manifolded to the housing and the reaction products are ported from the housing as required. Depending on the layer build-up, the fuel is either conveyed internally of the support tube and the oxidant is conveyed externally of the support tube (or vice versa). A practical fuel cell unit would be composed of many such tubes supported within an exterior housing, and manifolding would separate and direct the fuel and oxidant proximate the tubes.

A typical support tube might be formed of calcium stabilized zirconia ($ZrO_2+CaO$); the cathode typically would be applied to the exterior face of the support tube and might be in the form of lanthanum manganite ($LaMnO_3$) the electrolyte would be layered over a portion of the cathode, comprised, for example, of yttria-stabilized zirconia ($ZrO_2+Y_2O_3$); and the anode would be layered over the electrolyte comprised, for example, of a cobalt yttria-stabilized zirconia cermet or mixture ($Co+ZrO_2+Y_2O_3$). The oxidant would thereby flow internally of the structural tube while fuel will be circulated externally of the tube. For part of the cell where a series connection was to be made with an adjacent cell, the interconnection would be layered over the cathode at this location instead of the electrolyte and anode, to engage the anode of the adjacent cell. The interconnect might be comprised for example, of lanthanum chromite ($LaCrO_3$).

To form this type of fuel cell, the support tube must be formed with a high degree of porosity. Even with 40% porosity, the layered anode and cathode represent large diffusion barriers. The diffusion losses increase very steeply at high current densities and represent a limit on current and hence power. The minimum size of the support tube has been about 1 cm in diameter, with a side wall about 1 mm thick. A limiting factor of this support tube core arrangement is the length of path that the current must pass along the cathode and anode materials thereby inducing significant electrical resistant losses. In one effort to minimize this, the respective tubes have been shortened lengthwise and stacked end-to-end on one another, and the anodes and cathodes of the successive respective tubes have been interconnected in a serial fashion with an interconnect. This renders a single tube through which the fuel and/or oxidant passes, while the serial connection produces a higher voltage cumulative of the total number of serially interconnected individual tubes. The current flow is in line with the direction of the fuel and/or oxidant flow, namely axially of the tube configuration.

An alternate construction provides an electrical interconnect at a cordal arc section of the tube connected to the interior anode, for example, whereby adjacent tubes are stacked tangentially adjacent one another to establish a cathode-anode serial arrangement. As the current must pass circumferentially along the cathode and anode materials, significant electrical resistance losses are incurred.

Moreover, the tube supports are nonproductive and heavy so that the power and energy densities suffer when compared to other forms of energy conversion, including even the liquid electrolyte fuel cells more commonly operated at lower temperatures.

SUMMARY OF THE INVENTION

This invention relates to a solid oxide fuel cell and particularly to an improved method of making a core for such a cell.

An object of this invention to provide an improved method for making a solid oxide fuel cell core even of a complicated and compact cross section having many adjacent small passageways for containing the fuel and oxidant gases, where the wall structures defining the passageways can have short spans and thin cross sections.

A specific feature of this invention is making the solid oxide fuel cell core by building up the separate material layers that form the core in a multiple step sequential manner with minute or thin deposits of each material being applied endwise to the wall that is being fabricated, or axially along the passageways being formed for confining the fuel and oxidant designed to flow through the fuel cell core.

A preferred monolithic honeycomb fuel cell core fabricated according to this invention is comprised solely and exclusively of the active anode, cathode, electrolyte and interconnect materials, and with no nonactive materials for support.

A more detailed object of this invention is to provide a method for fabricating a solid oxide fuel cell core having thin electrolyte and interconnect walls, each comprised respectively of the anode and cathode materials layered onto opposite sides of the electrolyte material and onto the opposite side the interconnect material, the walls further being arranged to define passageways for the fuel and oxidant flow through the fuel cell core, the method being to build up the layered walls in a direction endwise to the walls themselves by separate and sequential step-by-step deposits or buildups of each of the materials, whereby core passageway arrays of virtually any complicated cross sections would be possible.

One preferred embodiment of the inventive method uses various shadow producing stencil or template-type devices having specific openings formed therein that register exactly with the intended endwise application of each material onto itself as a thin deposit or buildup in the direction of the layered wall structure to be formed. Different stencil or template type devices are provided for applying the different materials in adjacent proximity to one another. The method provides the separate and sequential and repetitive depositing of the materials only in the intended regions by having each material pass through the openings in the respective template, whereby complicated passageway core arrays comprised of electrolyte and interconnect walls can be defined and built up in a direction endwise to the walls themselves or axially along the core passageways. Trimming or etching of each material deposit may be done by laser or electron beams impingement, and chemical treatment of the material deposits may also be done by vapor or liquid wash.

The anode, cathode, electrolyte and interconnect materials are selected and modified to comply with the required: (1) electrically conductive aspects of the cathode, anode, and interconnect: (2) the ionic transport and electronic isolation aspect of the electrolyte; and (3) the gas porosity requirement of the cathode and anode and the gas imperforate requirement of the electrolyte and interconnect. Likewise the structural integrity, thermal expansion and contraction ratios, and crystal integrity of the composite monolithic core are designed for the specific operational parameters of temperature, pressure, gas flow rates, voltage and current densities necessary to provide optimal efficiency.

In a preferred embodiment of the invention, the interconnect and the electrolyte layers are thin (0.002–0.005 cm) while the sandwiching cathode and anode layers are perhaps between the same thickness or possibly up to perhaps ten times this (0.002–0.05 cm). The endwise deposit of each material, per application, will likewise be thin, of the order of 0.002–0.01 cm. Thus, for a core having a passageway length of 1 to 10 cms, between 100 and 5000 separate and sequential deposits of each material may be needed to form the overall core.

The monolithic core provide increased power density due to the increased active exposure areas of fuel and oxidant per the corresponding unit flow path volume, and due further to having only the active materials (the anode, cathode, electrolyte and interconnect) in the core. The fuel and oxidant passageways of the core can be very small, and likewise the core walls can be thin but yet self supporting over the small distances across the defined passageways, making possible shorter current paths and reduced resistance losses, and minimizing diffusion losses by eliminating thick support tubes entirely.

RELATED COFILED APPLICATIONS AND INVENTIONS

The application Ser. No. 544,213 filed Oct. 12,1983 entitled "Solid Oxide Fuel Cell Having Monolithic Core" cofiled herewith having John P. Ackerman and John E. Young as joint inventors, discloses a monolithically formed core consisting only of materials active in the electrochemical reactions. This means that the electrolyte and interconnect walls of the core would be formed respectively, only of anode and cathode materials layered on the opposite sides of electrolyte material, or on the opposite sides of interconnect material. This allows the use of very thin material layers and very thin resulting composite core walls. The thin composite core walls can be shaped to define small passageways, while yet having sufficient structural integrity to withstand the fluid pressures generated by gas flow through the passageways and the mechanical stresses due to the weight of the stacked core walls on one another. This beneficially increases the power density of the fuel cell because of its reduced size and weight.

The application Ser. No. 541,178 filed Oct. 12, 1983 entitled "Integral Maifolding Structure For Fuel Cell Core Having Parallel Gas Flow" cofiled herewith having Joseph E. Herceg as sole inventor, discloses means for directing the fuel and oxidant gases to parallel flow passageways in the core. A core wall projects beyond the open ends of the defined core passageways and is disposed approximately midway between and parallel to the adjacent overlying and underlying interconnect walls to define manifold chambers therebetween on opposite sides of the wall. Each electrolyte wall defining the flow passageways is shaped to blend into and be connected to this wall in order to redirect the corresponding fuel and oxidant passageways to the respective manifold chambers either above or below this intermediate wall. Inlet and outlet connections are made to these separate manifold chambers respectively, for carrying the fuel and oxidant gases to the core, and for carrying their reaction products away from the core.

The application Ser. No. 541,177 filed Oct. 12, 1983 entitled "Solid Oxide Fuel Cell Having Monolithic Cross Flow Core and Manifolding" cofiled herewith having Roger B. Poeppel and Joseph T. Dusek as joint inventors, discloses a monolithic core construction having the flow passageways for the fuel and for the oxidant gases extended transverse to one another, whereby full face core manifolding can be achieved for these gases and their reaction products. The core construction provides that only anode material surround each fuel passageway and only cathode material surround each oxidant passageway, each anode and each cathode material further being sandwiched at spaced opposing sides between electrolyte and interconnect materials. These composite anode and cathode wall structures are further alternately stacked on one another (with the separating electrolyte or interconnect material typically being a single common layer) whereby the fuel and oxidant passageways are disposed transverse to one another.

The application Ser. No. 544,176 filed Oct. 12, 1983 entitled "Solid Oxide Fuel Cell Having Compound Cross Flow Gas Patterns" cofiled herewith having Anthony V. Fraioli as sole inventor, discloses a core construction having both parallel and cross flow paths for the fuel and the oxidant gases. Each interconnect wall of the cell is formed as a sheet of inert support material having therein spaced small plugs of interconnect material, the cathode and anode materials being formed as layers on opposite sides of each sheet and being electrically contacted together by the plugs of the interconnect material. Each interconnect wall in a wavy shape is connected along spaced generally parallel line-like contact areas between corresponding spaced pairs of generally parallel electrolyte walls, operable to define one tier of generally parallel flow passageways for the fuel and oxidant gases. Alternate tiers are arranged to have the passageways disposed normal to one another. This provides for the solid mechanical connection of the interconnect walls of adjacent tiers to the opposite sides of the common electrolyte wall therebetween only at spaced point-like contact areas, where the previously mentioned line-like contact areas cross one another. The inert support material comprises between 2 and 98 wt. % of the whole core, varied as needed to minimize differential thermal expansion of the composite core wall structures.

BRIEF DESCRIPTION OF THE DRAWINGS

FIGS. 3, 4, 5, 6 and 7 are views similar to FIG. 2, except showing in overlying position to the fuel cell core, the various templates for allowing the buildup of each respective material deposit on one another to build up the core endwise of the core wall or in a direction axially of the defined flow passageways: and FIGS. 3a, 4a, 5a, 6a and 7a are sectional views as seen respectively from the lines 5—5 in the FIGS. 3, 4, 5, 6 and 7 illustrating the specific sequential endwise buildup of each material forming the core during its fabrication according to the subject invention.

DETAILED DESCRIPTION OF THE INVENTION

Figure 1:
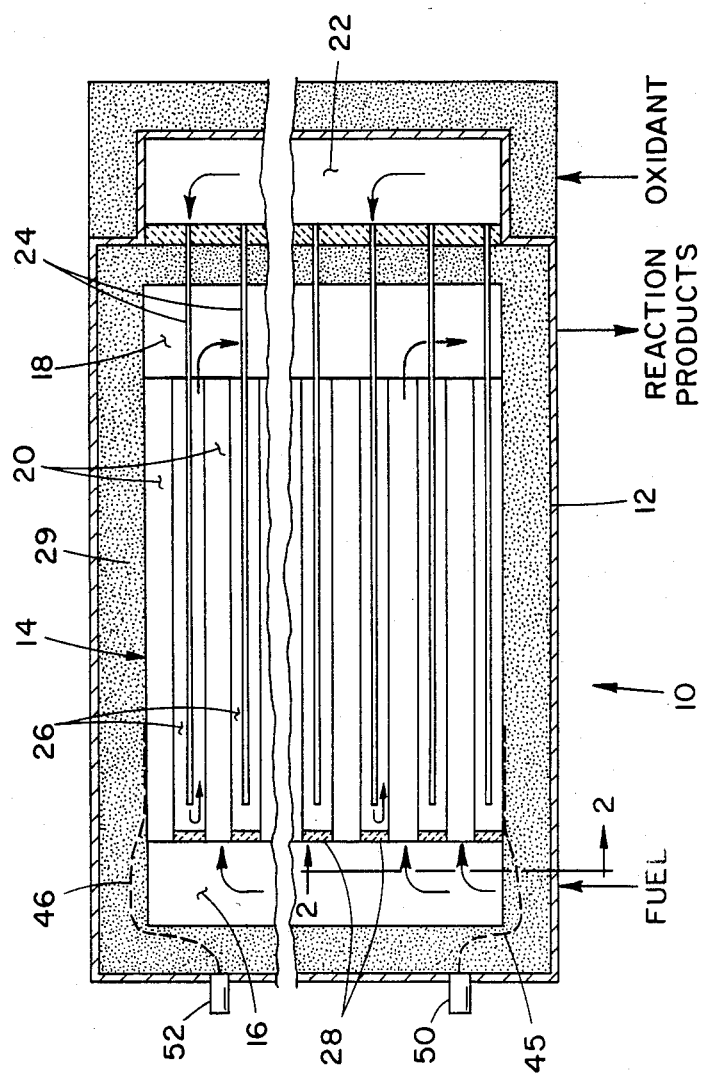
FIG. 1 is a sectional view, as seen generally from line 1—1 in FIG. 2, of a fuel cell formed according to a preferred embodiment of the invention, the illustration being somewhat schematical for clarity of disclosure.

FIG. 1 illustrates fuel cell 10 having a housing 12 within which a honeycomb core 14 is located. The housing is fluid tight defining an inlet manifold 16 for fuel and an outlet manifold 18 for the reaction products, the manifolds 16 and 18 communicating with one another via fuel passageways 20 formed in the core 14. Further, an inlet manifold 22 for oxidant is located adjacent the housing 12 and feed tubes 24 from the manifold 22 direct the oxidant into passageways 26 formed in the core. The passageways 26 are closed by end caps 28 adjacent the fuel manifold 16, but are open to the outlet manifold 18. The fuel passageways 20 and the oxidant passageways 26 are disposed parallel to one another, and are located alternately adjacent one another within the core 14. The annular space between the core 14 and the housing 12 is packed as at 29 with a ceramic powder or the like to minimize leakage of the gases between the fuel and outlet manifolds 16 and 18.

Figure 2:
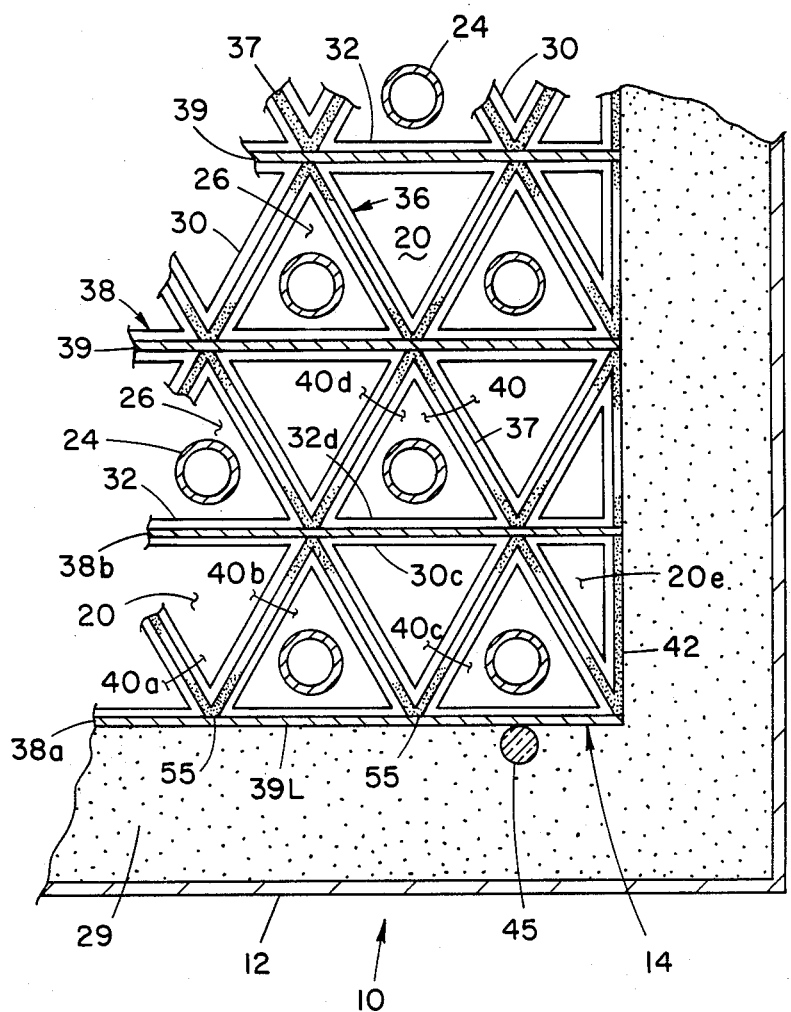
FIG. 2 is an enlarged sectional view as seen generally from line 2—2 in FIG. 1, illustrating the fuel cell in greater detail.

FIG. 2 illustrates in enlarged cross section a core 14 for the fuel cell 10 of FIG. 1. The passageways 20 for the fuel are formed with only anode material 30 defining the exposed passageways walls; while the passageways 26 for the oxidant are formed with only cathode material 32 defining the exposed passageway walls. Adjacent cell passageways 20 and 26 further basically are separated by either or both an electrolyte wall portion 36 and by an interconnect wall portion 38. The electrolyte wall portion 36 provides a thin layer of electrolyte material 37 between the anode material 30 and the cathode material 32. The interconnect wall portion provides a thin layer of interconnect material 39 between the anode and cathode materials 30 and 32.

Gaseous fuel would be conveyed from a source (not shown) to the manifold 16 for flow through the passageways 20 in the core 14 toward the outlet manifold 18. Likewise, oxidant would be carried from a source (not shown) to the manifold 22 for flow via the tubes 24 into the passageways 26 at locations adjacent the fuel manifold 16, and in turn for flow axially through the passageways toward the outlet manifold 18. The fuel and oxidant, admitted to the core at the purities and flow rates required, would react electrochemically across the electrolyte walls 36 separating the fuel and oxidant in the core. Fuel and oxidant not consumed in the core would react or combine by combustion within the outlet manifold 18 and subsequently be discharged with the other reaction products from the fuel cell.

Generally, the pressure differential between the fuel and reaction products manifolds 16 and 18 is quite low, and the velocity of the gases within or through the passageways 20 and 26 is likewise quite low.

It would be appreciated that each electrolyte wall 36, comprised of the electrolyte 37 sandwiched between the anode 30 and the cathode 32, electrochemically combines the fuel and oxidant being conveyed in the passageways 20 and 26, respectively, to develop an electrical potential across the electrolyte. This thereby defines a "cell" 40 in the overall fuel cell 10. Further, for all of the electrolyte walls thus confined between any pair of adjacent interconnect walls (38a and 38b, for example), there is an in-parallel electrical hookup of these cells (40a, 40b, for example). On the other hand, each interconnected wall (38b, for example) disposed between the separate cells above and below it (cells 40c and 40d, for example) electrically connects the cathode of one cell with the anode of the adjacent cell (cathode 32d with anode 30c, for example). This provides for an in-series hookup of the cells (40c and 40d, for example) on the opposite sides of the interconnect wall 38b. The electrolyte walls 36 are alternated or backfolded in effect between the interconnect walls 38 so that the fuel and oxidant passageways 20 and 26 are likewise alternately disposed between any pair of adjacent interconnect walls. At the side edge of the core, a neutral wall 42 will typically be used to define the boundary for the end fuel passageway 20e, the neutral wall having only the anode material and the electrolyte extended between the adjacent interconnect walls 38a, 38b, for example.

As will be appreciated, the cathode and anode layers of the electrolyte walls 36 are porous to the degree required to allow the fuel and oxidant gases confined on the opposite sides thereof to electrochemically combine, while the electrolyte layers and the interconnect walls are impervious and serve to isolate the fuel and oxidant gases completely from one another. Likewise, the electrolyte 36 is electrically not conductive, so that electrons do not pass between the cathode and anode formed on opposite sides of the electrolyte, but the electrolyte does provide ionic conductivity for ionic transfer between the cathode and anode. Moreover, both the cathode and anode are electrically conductive. On the other hand, the interconnect 39 electrically connects the anode and cathode of the cells on opposite sides of the wall together to provide a series connection of these adjacent cells.

In a practical fuel cell of the type shown in FIGS. 1 and 2, many serially connected cells 40c, 40d, etc. will be provided, exceeding perhaps even fifty. The outermost interconnects (or adjacent cathode or anode) of the series connections are connected electrically via conductors 45 and 46 (illustrated schematically in FIG. 1 and 2) to external terminals 50 and 52 of the fuel cell to provide a cumulative electrical output at the terminals. The conductors 45 and 46 may be connected to the lowermost anode or overlying interconnect material 39L, and the uppermost cathode or interconnect material (not shown). In this manner, the overall fuel cell voltage at the exterior terminals 50 and 52 might be of the order of between twenty and one hundred volts. As the conductors 45, 46 will typically be formed of a high temperature conductive metal, it will be advantageous to have the conductors in a fuel environment (rather that an oxidating environment) or to bleed a small amount of fuel over the conductors so as to minimize their oxidation.

In the previously mentioned copending application entitled "Solid Oxide Fuel Cell Having Monolithic Core", the fuel cell core 14 was proposed as a monolithic or rigid array of the cells. The core 14 was comprised solely or exclusively of the active anode, cathode, electrolyte or interconnect materials respectively, and no non-active material otherwise was used in the fuel cell core for the support of the passageways 20 and 26. Moreover each active material in the cross section of the wall was very thin as a layer, and the layers were fused together to form the monolithic core 14. The core walls 36 and 38 (and 42) immediately adjacent and defining the fuel and oxidant passageways 20 and 26 were quite short or of small spans to provide that the passageways themselves were of small cross section perhaps only several square millimeters. Because of the small wall spans, the thin layered materials each totaling only fractions of a centimeter in thickness would yet be structurally sufficient to support the core and any gas and/or reaction pressure loads required.

In this invention, it is contemplated to fabricate the monolithic core 14 by forming or building up the electrolyte walls 36 and the interconnect walls 38 according to a step by step and repetitive endwise layering or depositing of the materials. Thus, the build-up of the composite wall structure will be in line with or endwise of the wall structure itself, or axially of the defined passageways 20 and 26, and will take place in a repetitive material-layer-by-material-layer buildup.

A shadow producing stencil or template device would be provided for blocking the application or deposit of material except in the precise intended location of the material, and only through openings in the template. A separate template is used for applying each of the anode, cathode, interconnect and electrolyte materials. Each of the templates would have a generally planar shape to span the entire cross sectional area of the core and many thin slots or openings would be formed therein according to the specific pattern of the material to be added with the template.

Figure 3:
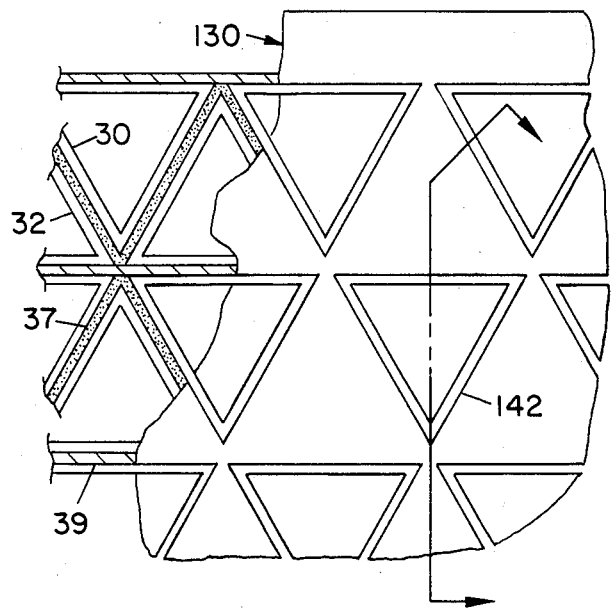
Figure 3A:
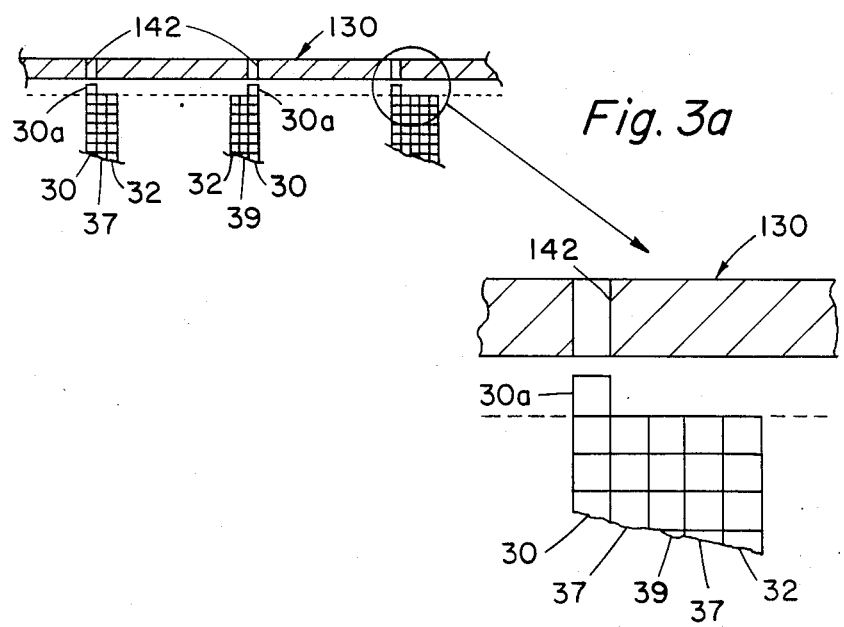

Thus the anode template 130 (FIG. 3) and the cathode template 232 (FIG. 4) to fabricate the design shown each would have a series of narrow triangularly shaped slots (142 and 242) formed therein which would be in perfect registry when the template were in place within the core fabricating enclosure (not shown) with the location where the anode 30 or cathode 32 would be deposited. See FIGS. 3a and 4a also, that shows the typical core walls underlying the template during fabrication. Upon energization of the material discharging apparatus (such as a painting, spraying, vapor deposition or like apparatus, not shown), the released anode material or the released cathode material would pass through the template openings (142 and 242) to buildup at the locations intended (30a and 32a in FIGS. 3a and 4a respectively). The anode and the cathode materials would be deposited separately and sequentially, and each deposit would be made to keep the overall buildup of the materials approximately uniform or even.

After the cathode and anode materials had been deposited, it may be necessary to trim or etch the intended side or sides of the buildup. This might be performed by a laser or equivalent high energy electron beam.

The electrolyte template 337 (FIG. 5) and the interconnect template 439 (FIG. 6), each having the appropriately formed series of slots or openings 342 (FIG. 5) and 442 (FIG. 6), would then be located in place to have the openings openings (342 or 442) located in registry according to the pattern or configuration of the respective deposit 37a (FIG. 5) or 39a (FIG. 6) of the electrolyte or interconnect material onto the core array. The electrolyte or interconnect materials would be confined laterally by the prior defined deposit of the cathode and anode; and the material deposit would be of such thickness so as to keep the overall buildup of the materials approximately uniform or even, or would be approximately the same as the anode and cathode deposits.

In the particular examples thus far discussed, the various templates are individually different and produce the pattern of the specific material deposit and buildup endwise of the defined wall structure. It will be understood of course that many such deposits are required, each of perhaps only 0.001 to 0.01 cm thick, to achieve a total axial buildup to form the finished core array. The probable desired cross section of any core passageway 20 or 26 is of the order of only perhaps 0.001 to 0.01 cm having perhaps separate wall lengths or spans of only perhaps 0.01 to 0.3 cm and cross dimensions of slightly less across the opening of the passageway. Each wall correspondingly is only perhaps 0.006 to 0.11 cm in thickness. The ratio of core passageway length to core passageway opening or wall span, depends on design consideration, but might be in the range of between 5 and 25.

In an alternate embodiment of the method, the stepped or sequential buildup of the core endwise of the walls being built up might also be done with a plug or filter material being applied in the void area intended for the passageways. The filler material might be an organic polymer and would be burned or baked away in a subsequent sintering process that would be needed and performed to stabilize and set the core. The template 560 for allowing for the selective deposit 60a of filler material 60 through the slot 542 in the template is illustrated in FIGS. 7 and 7a.

In yet another alternate embodiment of the method, the respective deposits of the cathode and anode by using the respective templates would be the same; while the deposits of the interconnect and electrolyte between the buildups of the cathode and anode might be by jet spraying (and without the blocking templates) but using the prior deposits of the cathode and anode as location constraints for the applied interconnect and electrolyte deposits.

In yet a different embodiment, the electrolyte template 337 (FIG. 5) can be modified at the corners of the slots or openings 342, as by closing the openings, so that no electrolyte 37 would be applied at the corners. Thus, the five layer wall cross section as illustrated at the left end of the FIGS. 3a, 4a, 5a, 6a and 7a would be reduced to only three layers (the electrolyte 37 being eliminated), namely the cathode 32, interconnect 39 and the anode 30.

Also, in any of the particular methods disclosed, it may be desirable at various sequences along the buildup of the core (1) to heat sinter the core to give it dimensional and structural stability and then resume the material buildup endwise of the remainder of the core; or (2) to etch or trim the deposit edges or even surfaces by electron or laser beam; or (3) to treat the deposits chemically or physically (radiation) to produce required effects.

The embodiments of the invention in which an exclusive property or privilege is claimed are defined as follows:

1. A method of making a fuel cell core for electrochemically combining fuel and oxidant for generation of galvanic output, the core having an array of electrolyte and interconnect walls, each electrolyte wall consisting of thin layers of cathode and anode materials respectively, sandwiching a thin layer of electrolyte material therebetween, each interconnect wall consisting of thin layers of the cathode and anode, respectively sandwiching a thin layer of interconnect material therebetween, whereby separate sections of said electrolyte wall are arranged between separate sections of adjacent interconnect walls operable to define a plurality of core passageways alternately arranged respectively where the inside faces thereof are formed either of only the anode material or of only the cathode material, each core passageway having the anode material on the inside being for the passage of fuel and each core passageway having the cathode material on the inside being for the passage of oxidant, the method being to build up the core electrolyte and interconnect walls simultaneously in a direction endwise of the walls and axially of the defined core passageways by applying the separate anode, cathode, electrolyte and interconnect materials onto itself as fine deposits or buildups according to the pattern of material as required in the core, the material applications for the respective materials being made separately and sequentially and repetitively to buildup the wall structure endwise of itself or axially of the core passageways, and heat curing the composite core to fuse the material layers and deposits together and make the core monolithic and dimensionally stable.

2. The method of making an electrochemical fuel cell core according to claim 1, wherein said cathode material is lanthanum manganite ($LaMnO_3$); said anode material is cobalt yttria-stabilized zirconia cermet or mixture ($Co + ZrO_2 + Y_2O_3$); said electrolyte is yttria-stabilized zirconia ($ZrO_2 + Y_2O_3$) and said interconnect is lanthanum chromite ($LaCrO_3$), the lanthanum manganite and lanthanum chromite being suitably doped to obtain electrical conductivity.

3. The method of making an electrochemical fuel cell core according to claim 1, wherein the cathode and anode materials are each applied in a continuous endless loop pattern spaced from one another and disposed substantially parallel to one another as they are being built up the define core passageways are generally parallel relative to one another and extended in a direction axially through the core.

4. The method of making an electrochemical fuel cell core according to claim 3, wherein said electrolyte and interconnect materials are each applied between the deposits of the cathode and anode materials sequentially after the later material deposits had been applied.

5. The method of making an electrochemical fuel cell core according to claim 4, wherein the cathode and anode material deposits are each of the order of 0.002–0.05 cm in the thickness and are correspondingly similar.

6. The method of making an electrochemical fuel cell core according to claim 5, wherein the electrolyte and interconnect materials each is of the order of 0.002–0.01 cm in the layer thickness of the defined wall structure, and wherein the material deposit of each per application is of the order of 0.002–0.05 cm to correspond to the buildup per application of the anode and cathode materials.

7. The method of making an electrochemical fuel cell core according to claim 5, wherein each electrolyte wall is of the order of 0.006–0.110 cm thick.

8. The method of making an electrochemical fuel cell core according to claim 5, wherein each interconnect wall is of the order of 0.006–0.110 cm thick.

9. The method of making an electrochemical fuel cell core according to claim 1, wherein the electrolyte and interconnect walls are substantially devoid of any composite inert material.

10. The method of making an electrochemical fuel cell core according to claim 1, and further etching or trimming the deposits by high energy beam.

11. The method of making an electrochemical fuel cell according to claim 1, wherein each application of the cathode and anode materials is by means such as painting.

12. The method of making an electrochemical fuel cell according to claim 1, wherein each application of the cathode and anode materials is by means such as spraying.

13. The method of making an electrochemical fuel cell according to claim 1, wherein each application of the cathode and anode materials is by means such as vapor deposition.

14. The method of making an electrochemical fuel cell core according to claim 12, wherein the electrolyte and interconnect walls are substantially devoid of any composite inert material.

15. The method of making an electrochemical fuel cell core according to claim 14, and further etching or trimming the deposits by high energy beam.

16. The method of making an electrochemical fuel cell core according to claim 15, wherein said electrolyte and interconnect materials are each applied between the deposits of the cathode and anode materials sequentially after the later material deposits had been applied.

17. The method of making an electrochemical fuel cell core according to claim 16, wherein the cathode and anode material deposits are each of the order of 0.002–0.05 cm in the thickness and are correspondingly similar.

18. The method of making an electrochemical fuel cell core according to claim 17, wherein the electrolyte and interconnect materials each is of the order of 0.002–0.01 cm in the layer thickness of the defined wall structure, and wherein the material deposit of each per application is of the order of 0.002–0.05 cm to correspond to the buildup per application of the anode and cathode materials.

19. The method of making an electrochemical fuel cell according to claim 1, wherein further applying a filter material separately and sequentially and repetitively where the passageways will be defined to fill the passageways, and heating the core as it has been built up so as to remove the filler material.

* * * * *